US012725817B2

(12) United States Patent
Park et al.

(10) Patent No.: US 12,725,817 B2
(45) Date of Patent: Sep. 1, 2026

(54) HYDROGEN SUPPLY SYSTEM FOR FUEL CELL AND CONTROL METHOD THEREOF

(71) Applicants: Hyundai Motor Company, Seoul (KR); Kia Corporation, Seoul (KR)

(72) Inventors: Hyo Jin Park, Hwaseong-Si (KR); Won Jung Kim, Seongnam-Si (KR); Jae Young Shim, Yongin-Si (KR); Min Taek Kim, Seoul (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 795 days.

(21) Appl. No.: 17/974,197

(22) Filed: Oct. 26, 2022

(65) Prior Publication Data

US 2023/0402633 A1 Dec. 14, 2023

(30) Foreign Application Priority Data

Jun. 9, 2022 (KR) ........................ 10-2022-0070037

(51) Int. Cl.
*H01M 8/04746* (2016.01)
*H01M 8/04089* (2016.01)
*H01M 8/0438* (2016.01)

(52) U.S. Cl.
CPC ... *H01M 8/04753* (2013.01); *H01M 8/04089* (2013.01); *H01M 8/04388* (2013.01)

(58) Field of Classification Search
CPC ......... H01M 8/04746; H01M 8/04753; H01M 8/04761; H01M 8/04089; H01M 8/04082;
(Continued)

(56) References Cited

U.S. PATENT DOCUMENTS 8,859,158 B2 * 10/2014 Kwon ............... H01M 8/04395 429/432
10,804,548 B2 10/2020 Saito
(Continued)

FOREIGN PATENT DOCUMENTS

JP 2005-123076 5/2005
JP 2017-062927 3/2017
(Continued)

OTHER PUBLICATIONS

Colleen Spiegel, Fuel cell operating conditions, Fuel Cell Information (Year: 2017).*

*Primary Examiner* — Dah-Wei D. Yuan
*Assistant Examiner* — Pin Jan Wang
(74) *Attorney, Agent, or Firm* — MORGAN, LEWIS & BOCKIUS LLP

(57) ABSTRACT

A hydrogen supply system for a fuel cell and a control method thereof includes a fuel cell, a hydrogen supply line connected to an inlet side of an anode of the fuel cell and supplying hydrogen to the fuel cell, a hydrogen supply pressure sensor configured for measuring pressure of the hydrogen supply line, and a controller electrically connected to the hydrogen supply pressure sensor and configured for deriving a correction value of the hydrogen supply pressure sensor, supplying hydrogen after air supply is cut off during an operation of the fuel cell, measuring a pressure variation of the hydrogen supply line, and determining whether to use a correction value of the hydrogen supply pressure sensor based on the measured pressure variation.

8 Claims, 5 Drawing Sheets

(58) Field of Classification Search

CPC ......... H01M 8/04104; H01M 8/04388; H01M 8/0438; H01M 8/04201; H01M 8/04223; H01M 8/04228; H01M 8/04231; H01M 8/04313; H01M 8/04298; H01M 8/04303; H01M 8/04664; H01M 8/04686; H01M 8/04402; H01M 2250/20; H01M 8/04992; Y02E 60/50

See application file for complete search history.

(56) References Cited

U.S. PATENT DOCUMENTS

| | | | | |
|---|---|---|---|---|
| 10,879,545 | B2 | 12/2020 | Takeyama | |
| 10,914,650 | B2 * | 2/2021 | Kim | H01M 8/04753 |
| 2006/0073363 | A1 * | 4/2006 | Taniguchi | H01M 8/0438 429/513 |
| 2012/0015268 | A1 * | 1/2012 | Yoshida | H01M 8/04567 429/429 |
| 2016/0133975 | A1 * | 5/2016 | Yamamoto | H01M 8/04783 429/410 |
| 2017/0047602 | A1 * | 2/2017 | Sato | H01M 8/04798 |
| 2018/0233756 | A1 * | 8/2018 | Fujita | H01M 8/04231 |

FOREIGN PATENT DOCUMENTS

| | | |
|---|---|---|
| JP | 6436033 | 12/2018 |
| KR | 10-2016-0061460 | 6/2016 |
| KR | 10-1679961 | 11/2016 |
| KR | 10-2018-0114585 | 10/2018 |
| KR | 10-2021-0071677 | 6/2021 |

* cited by examiner

HYDROGEN SUPPLY SYSTEM FOR FUEL CELL AND CONTROL METHOD THEREOF

CROSS REFERENCE TO RELATED APPLICATION

The present application claims priority to Korean Patent Application No. 10-2022-0070037, filed Jun. 9, 2022, the entire contents of which is incorporated herein for all purposes by this reference.

BACKGROUND OF THE PRESENT DISCLOSURE

Field of the Present Disclosure

The present disclosure relates to a hydrogen supply system for a fuel cell and a control method thereof, in which hydrogen is supplied after air supply is cut off during the operation of the fuel cell when a correction value of a hydrogen supply pressure sensor is derived, and the pressure variation of a hydrogen supply line is measured, thus determining whether to use the correction value of the hydrogen supply pressure sensor based on the measured pressure variation.

Description of Related Art

A fuel cell system includes a hydrogen supply system, an air supply system, and a fuel cell that produces electrical energy using a chemical reaction between supplied hydrogen and oxygen.

A hydrogen supply system for supplying the hydrogen to the fuel cell includes a hydrogen supply line which is connected to an anode side of the fuel cell to supply the hydrogen to the fuel cell and recycle the hydrogen. Furthermore, the hydrogen supply system further includes a hydrogen storage tank in which high-pressure hydrogen is stored, a hydrogen supply valve which supplies the hydrogen of the hydrogen storage tank to the hydrogen supply line, and a discharge line which discharges impurities and condensate present in a fuel cell anode.

The hydrogen supply valve supplies the hydrogen of the hydrogen storage tank to the hydrogen supply line according to the generated current, temperature, and pressure of the fuel cell. The hydrogen supply line is provided with a hydrogen supply pressure sensor configured for measuring the pressure of the hydrogen supply line, and the sensing value of the hydrogen supply pressure sensor is used to control the opening of the hydrogen supply valve. However, a deviation frequently occurs in the sensing value of the hydrogen supply pressure sensor, so that the pressure of the hydrogen supply line is not precisely controlled. Accordingly, research on a technique for correcting the sensing value of the hydrogen supply pressure sensor is being conducted.

The pressure of the hydrogen supply line is precisely controlled by reflecting a correction value in the sensing value of the hydrogen supply pressure sensor. The correction value is determined as a difference between atmospheric pressure and the sensing value of the hydrogen supply pressure sensor by opening the discharge line connected to the outside for a certain time. However, the correction value is determined under the condition where the discharge line is sufficiently exposed to the outside thereof, and does not reflect the failure of the discharge valve such as the clogging of the discharge valve provided on the discharge line, an insufficient opening amount, or freezing. Furthermore, there is a problem in that hydrogen is supplied excessively or insufficiently to the fuel cell by use of the determined correction value despite the occurrence of the failure of the discharge valve.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hydrogen supply system for a fuel cell and a control method thereof, in which hydrogen is supplied after air supply is cut off during the operation of the fuel cell when a correction value of a hydrogen supply pressure sensor is derived, and the pressure variation of a hydrogen supply line is measured, thus determining whether to use the correction value of the hydrogen supply pressure sensor based on the measured pressure variation.

To achieve the objective of the present disclosure, the present disclosure provides a hydrogen supply system for a fuel cell, the system including the fuel cell; a hydrogen supply line connected to an inlet side of an anode of the fuel cell to supply hydrogen to the fuel cell; a hydrogen supply pressure sensor configured for measuring pressure of the hydrogen supply line; and a controller electrically connected to the hydrogen supply pressure sensor and configured for deriving a correction value of the hydrogen supply pressure sensor, supplying hydrogen after air supply is cut off during an operation of the fuel cell, measuring a pressure variation of the hydrogen supply line, and determining whether to use the correction value of the hydrogen supply pressure sensor based on the measured pressure variation.

The controller may induce charging of a battery until voltage of the fuel cell reaches below effective voltage when the air supply is cut off during an operation of the fuel cell, and may supply hydrogen when the voltage of the fuel cell reaches below the effective voltage.

The controller may stop supplying hydrogen if the pressure of the hydrogen supply line reaches a target pressure value when hydrogen is supplied after the air supply is cut off, and may measure a pressure reduction amount of the hydrogen supply line for a reference time period from a time when the hydrogen supply is stopped, as a pressure variation.

The target pressure value may be a pressure value which is greater than atmospheric pressure and is supplied to the fuel cell above a minimum pressure value required during the operation of the fuel cell.

The controller may store the measured pressure variation of the hydrogen supply line in a memory.

The hydrogen supply system may further include a discharge line connected to an outlet side of the anode of the fuel cell to communicate with an outside thereof; and a discharge valve provided on the discharge line to control communication between the outlet side of the anode of the fuel cell and the outside. The controller may supply hydrogen to the target pressure value after the operation of the fuel cell is terminated, and may open the discharge valve for a reference time when hydrogen supply is completed.

The controller may derive the pressure value of the hydrogen supply line detected by the hydrogen supply pressure sensor after the discharge valve is opened for the reference time, and may determine a difference between the derived pressure value of the hydrogen supply line and the target pressure value, as a pressure error.

The controller may reflect a correction factor in the pressure variation stored in the memory, and may compare the pressure variation in which the correction factor is reflected with a magnitude of the pressure error, thus determining whether to use the correction value of the hydrogen supply pressure sensor.

The controller may measure a maximum opening amount and a maximum opening arrival time of the discharge valve after the discharge valve is opened, and the correction factor may be determined based on the maximum opening amount and the maximum opening arrival time of the discharge valve.

The controller may be configured to determine whether to use the maximum opening amount and the maximum opening arrival time of the discharge valve measured based on a previously stored reference value of the discharge valve, and may determine the correction factor depending on the maximum opening arrival time of the discharge valve when the measured maximum opening amount and maximum opening arrival time of the discharge valve are available.

The controller may use the correction value of the hydrogen supply pressure sensor, when the determined pressure error is greater than a pressure variation value in which the correction factor is reflected.

The controller may not use the correction value of the hydrogen supply pressure sensor, and may eliminate the correction value of the hydrogen supply pressure sensor to derive the correction value of the hydrogen supply pressure sensor again, when the determined pressure error is smaller than a pressure variation value in which the correction factor is reflected.

To achieve the objective of the present disclosure, the present disclosure provides a method of controlling a hydrogen supply system for a fuel cell, the method including deriving a correction value of a hydrogen supply pressure sensor by a controller; supplying hydrogen after air supply is cut off during operation of the fuel cell by the controller; and measuring a pressure variation of a hydrogen supply line after hydrogen is supplied and determining whether to use the correction value of the hydrogen supply pressure sensor based on the measured pressure variation by the controller.

In the supplying the hydrogen after the air supply is cut off, the controller may supply the hydrogen so that pressure of the hydrogen supply line reaches a target pressure value.

In the determining whether to use the correction value of the hydrogen supply pressure sensor, the controller may stop supplying hydrogen when the pressure of the hydrogen supply line reaches the target pressure value, may measure a pressure variation of the hydrogen supply line for a reference time period from a time when the hydrogen supply is stopped, and may store the measured pressure variation in a memory.

In the determining whether to use the correction value of the hydrogen supply pressure sensor, the controller may reflect the correction factor in the pressure variation stored in the memory, may open the discharge valve for the reference time, then may derive the pressure value of the hydrogen supply line detected by the hydrogen supply pressure sensor, and may compare the pressure variation in which the correction factor is reflected with a difference between the derived pressure value of the hydrogen supply line and the target pressure value, thus determining whether to use the correction value of the hydrogen supply pressure sensor.

A hydrogen supply system for a fuel cell and a control method thereof according to an exemplary embodiment of the present disclosure are advantageous in that the correction value of a hydrogen supply pressure sensor is derived, and then it is determined whether to use the correction value of a hydrogen supply pressure sensor based on the pressure variation of a hydrogen supply line in which the correction factor determined depending on the state of a discharge valve is reflected, thus preventing the excessive supply or lack of hydrogen due to the incorrectly derived correction value of the hydrogen supply pressure sensor.

Furthermore, a correction factor determined according to the condition of a discharge valve is reflected in the pressure variation of a hydrogen supply line when it is determined whether to use the correction value of a hydrogen supply pressure sensor, thus enhancing the reliability of the correction value of the hydrogen supply pressure sensor.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
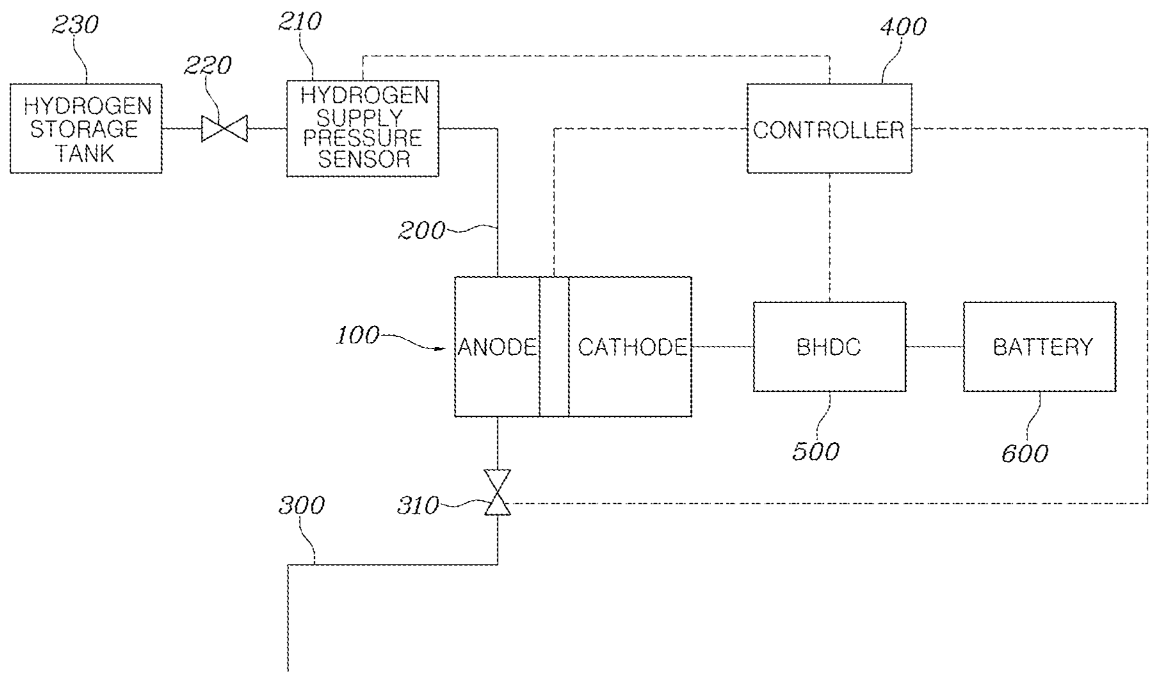
FIG. 1 is a diagram illustrating the configuration of a hydrogen supply system for a fuel cell according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

When it is determined that the detailed description of the known art related to the present disclosure may be obscure the gist of the present disclosure, the detailed description thereof will be omitted. Furthermore, it is to be understood that the accompanying drawings are merely for making those skilled in the art easily understand embodiments disclosed herein, and the present disclosure is directed to cover not only exemplary embodiments disclosed herein, but also various alternatives, modifications, equivalents and other embodiments that fall within the spirit and scope of the present disclosure.

It will be understood that, although the terms “first”, “second”, etc. may be used herein to describe various elements, these elements should not be limited by these terms. These terms are only used to distinguish one element from another element.

It will be understood that when an element is referred to as being “coupled” or “connected” to another element, it may be directly coupled or connected to the other element or intervening elements may be present therebetween. In contrast, it should be understood that when an element is referred to as being “directly coupled” or “directly connected” to another element, there are no intervening elements present.

Herein, the singular forms are intended to include the plural forms as well, unless the context clearly indicates otherwise.

It will be further understood that the terms “comprise”, “include”, “have”, etc. When used in the present specification, specify the presence of stated features, integers, steps, operations, elements, components, and/or combinations thereof but do not preclude the presence or addition of one or more other features, integers, steps, operations, elements, components, and/or combinations thereof.

Hereinafter, the present disclosure will be explained in detail by describing exemplary embodiments of the present disclosure with reference to the accompanying drawings. The same reference numerals are used throughout the drawings to designate the same or similar components.

Figure 2:
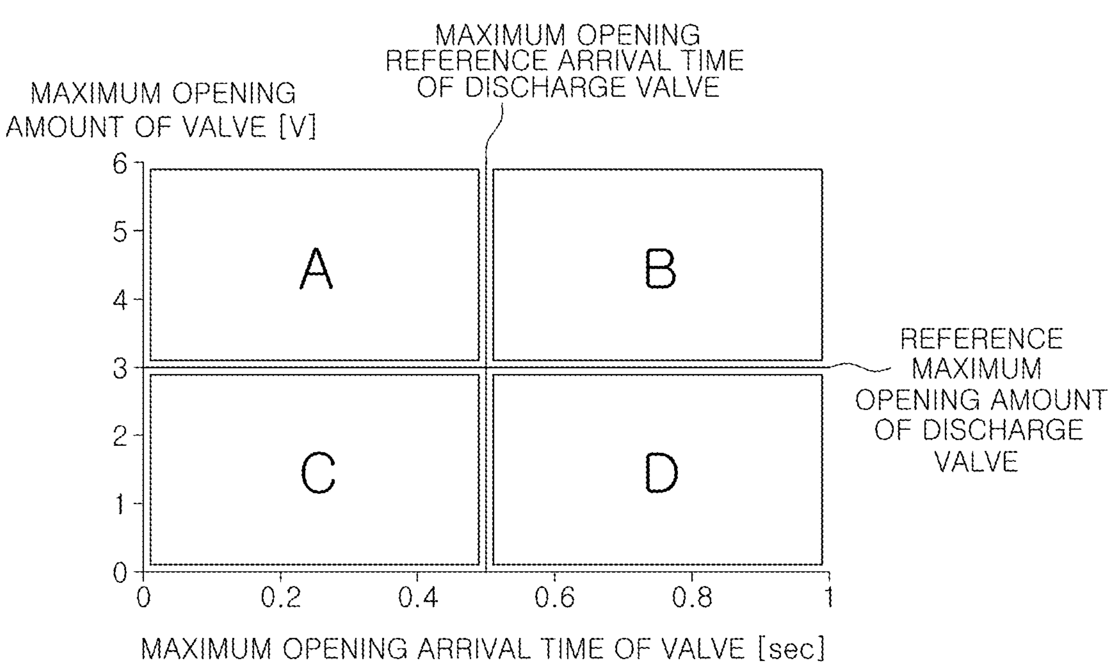
FIG. 2 is a graph determining the condition of a discharge valve when the hydrogen supply system for the fuel cell according to an exemplary embodiment of the present disclosure is controlled.
Figure 3:
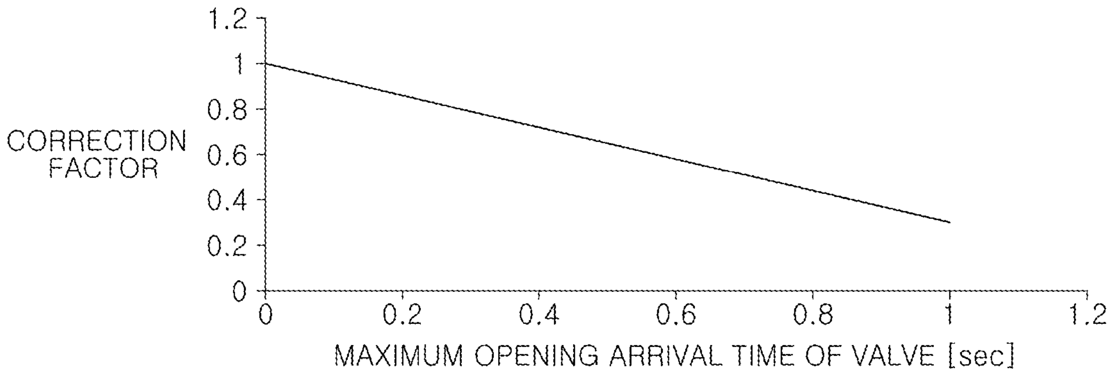
FIG. 3 is a graph determining a correction factor depending on the condition of the discharge valve when the hydrogen supply system for the fuel cell according to an exemplary embodiment of the present disclosure is controlled.
Figure 4:
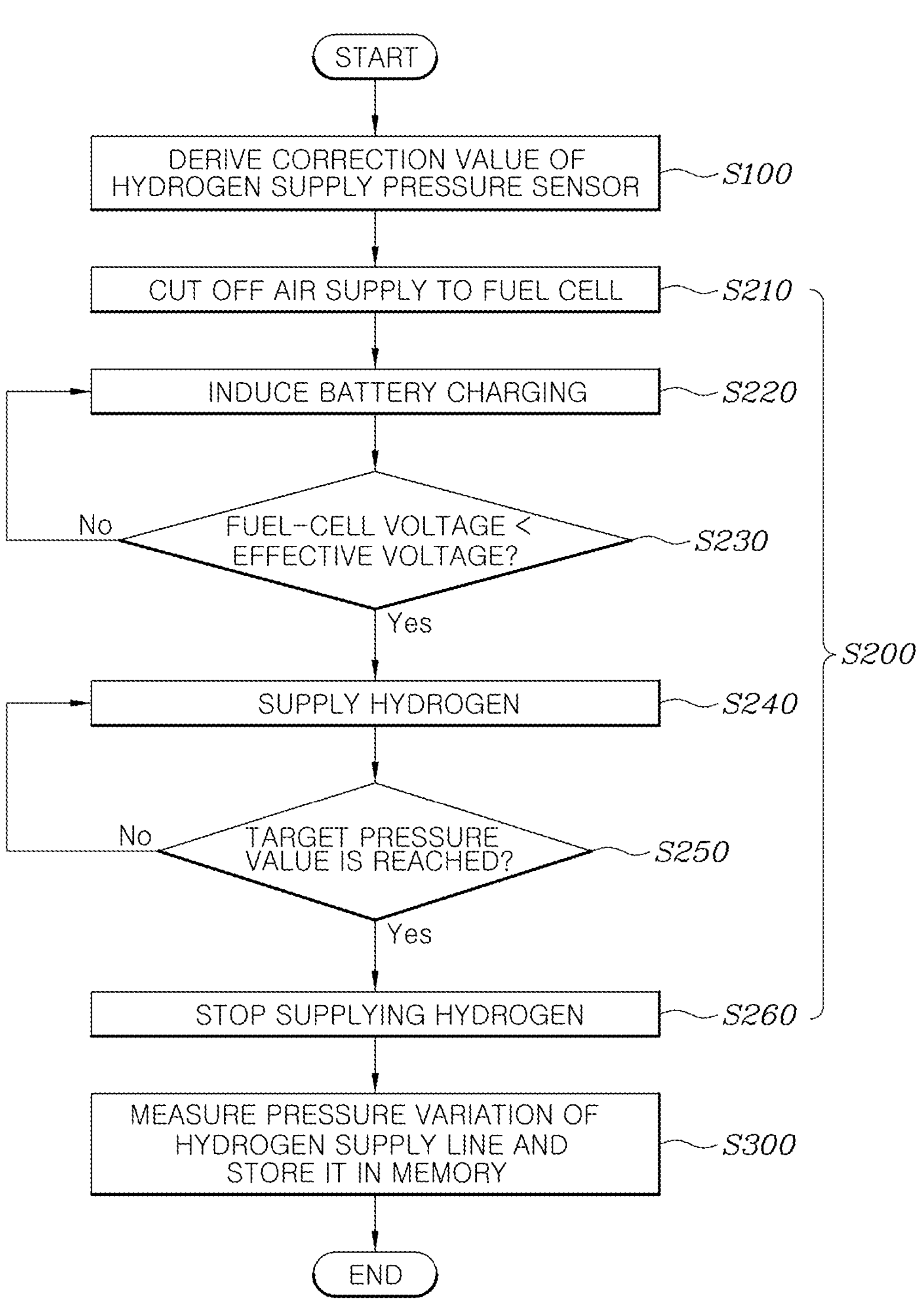
FIG. 4 is a flowchart illustrating a method of controlling a hydrogen supply system for a fuel cell during the operation of the fuel cell, according to an exemplary embodiment of the present disclosure.
Figure 5:
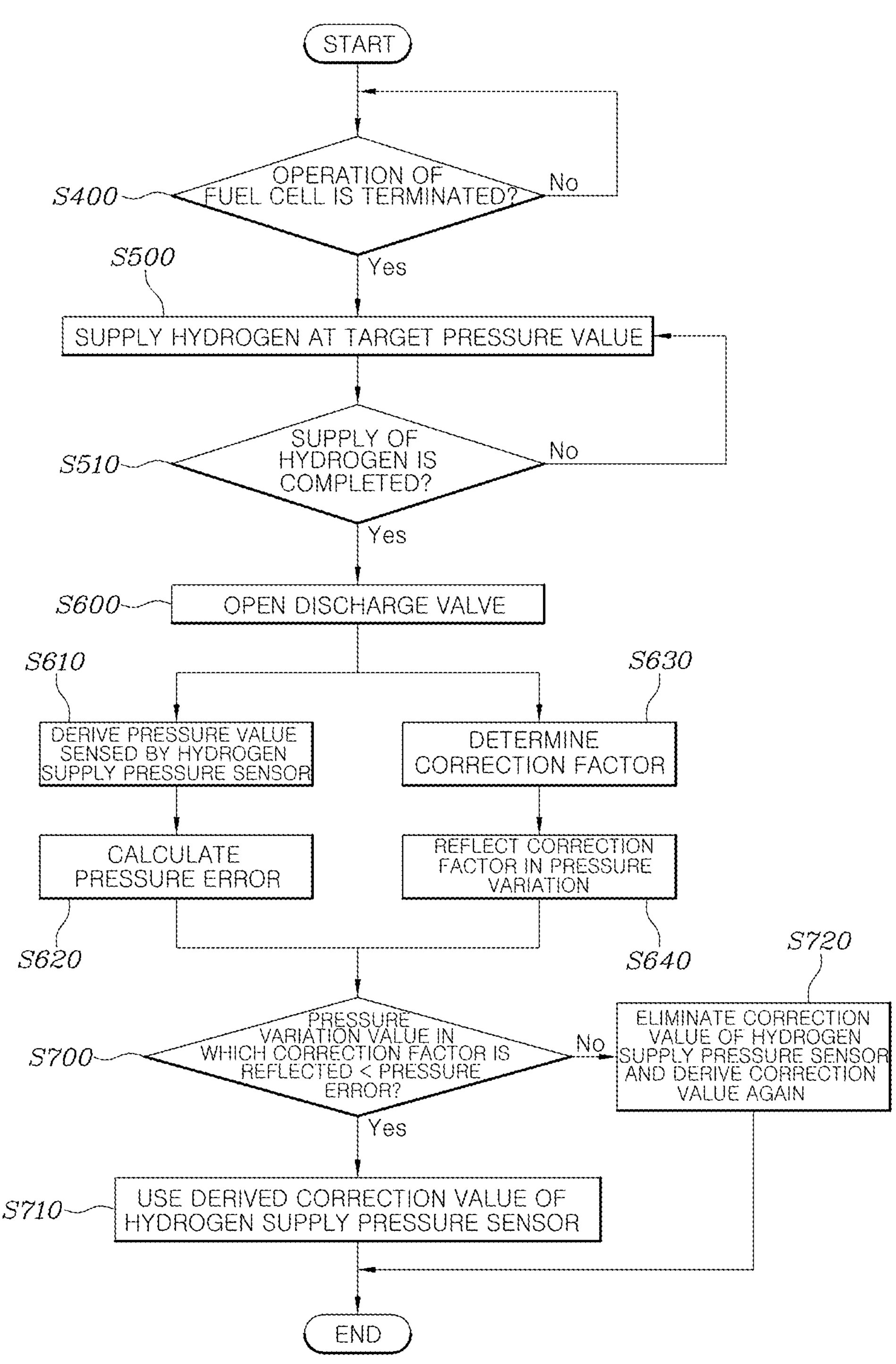
FIG. 5 is a flowchart illustrating the method of controlling the hydrogen supply system for the fuel cell after the operation of the fuel cell is terminated, according to an exemplary embodiment of the present disclosure.

FIG. 1 is a diagram illustrating the configuration of a hydrogen supply system for a fuel cell according to an exemplary embodiment of the present disclosure, FIG. 2 is a graph determining the condition of a discharge valve when the hydrogen supply system for the fuel cell according to an exemplary embodiment of the present disclosure is controlled, and FIG. 3 is a graph determining a correction factor depending on the condition of the discharge valve when the hydrogen supply system for the fuel cell according to an exemplary embodiment of the present disclosure is controlled. FIG. 4 is a flowchart illustrating a method of controlling a hydrogen supply system for a fuel cell during the operation of the fuel cell, according to an exemplary embodiment of the present disclosure, and FIG. 5 is a flowchart illustrating the method of controlling the hydrogen supply system for the fuel cell after the operation of the fuel cell is terminated, according to an exemplary embodiment of the present disclosure.

FIG. 1 is a diagram illustrating the configuration of a hydrogen supply system for a fuel cell according to an exemplary embodiment of the present disclosure. The hydrogen supply system for the fuel cell 100 according to an exemplary embodiment of the present disclosure includes a fuel cell 100, a hydrogen supply line 200 connected to an inlet side of a fuel cell anode and supplying hydrogen to the fuel cell 100, a hydrogen supply pressure sensor 210 measuring pressure of the hydrogen supply line 200, and a controller 400 determining a correction value of the hydrogen supply pressure sensor 210, supplying hydrogen after air supply is cut off during an operation of the fuel cell 100, measuring a pressure variation of the hydrogen supply line 200, and determining whether to use a correction value of the hydrogen supply pressure sensor 210 based on the measured pressure variation.

The controller 400 according to an exemplary embodiment of the present disclosure may be implemented through a non-volatile memory configured to store data about an algorithm configured to control the operation of various components of a vehicle or a software instruction for reproducing the algorithm, and a processor configured to perform an operation, which will be described below, using the data stored in the memory. In this regard, the memory and the processor may be implemented as separate chips. Alternatively, the memory and the processor may be implemented as a single integrated chip, and the processor may take the form of one or more processors.

The hydrogen supply system of the fuel cell 100 includes a hydrogen storage tank 230 that stores high-pressure hydrogen, a hydrogen supply line 200 that supplies hydrogen to the fuel cell 100, a hydrogen supply valve 220 that delivers stored hydrogen to the hydrogen supply line 200, etc. The controller 400 adjusts the amount of hydrogen flowing in the hydrogen supply line 200 by checking the amount of hydrogen required in the fuel cell 100 and controlling the hydrogen supply valve 220. The hydrogen supply system further includes a hydrogen supply pressure sensor 210 which is configured to measure the pressure of the hydrogen supply line 200, and is configured to control the opening amount of the hydrogen supply valve 220 by sensing pressure through the hydrogen supply pressure sensor 210. However, an error may frequently occur in a pressure sensing value of the hydrogen supply pressure sensor 210, and the pressure of the hydrogen supply line 200 may not be precisely controlled due to the error of the sensing value.

A conventional hydrogen supply system is directed to precisely control the pressure of the hydrogen supply line 200 by correcting the pressure sensing value of the hydrogen supply pressure sensor 210. When the sensing value of the hydrogen supply pressure sensor 210 is corrected, the controller 400 determines that the anode of the fuel cell 100 is sufficiently exposed to an outside by opening the discharge valve 310 for a certain time. However, because the controller 400 does not recognize the failure of the discharge valve 310 due to the clogging of a pipe, an insufficient opening amount, or freezing, an error may occur when correcting the sensing value of the hydrogen supply pressure sensor 210.

Thus, the present disclosure is directed to reduce a problem occurring when correcting the hydrogen supply pressure sensor 210 by measuring the reduction amount of hydrogen pressure caused by the crossover of the fuel cell anode during the operation of the fuel cell 100 and recognizing the failure of the discharge valve 310 based on the reduction amount of the hydrogen pressure.

First, the controller 400 supplies hydrogen to the fuel cell 100, and measures the reduction amount of hydrogen pressure occurring during the operation of the fuel cell 100. The controller 400 induces the charging of a battery until the voltage of the fuel cell 100 reaches below effective voltage when air supply is cut off during the operation of the fuel cell 100, and supplies hydrogen if the voltage of the fuel cell 100 reaches below the effective voltage. The controller 400 cuts off the air supply during the operation of the fuel cell 100, and performs the power generating operation of the fuel cell 100 to exhaust air remaining in the fuel cell 100. The controller 400 induces the charging of the battery 600 with voltage generated when the fuel cell 100 produces the power. At the instant time, the controller 400 induces the charging of the battery 600 by controlling a Bi directional High voltage Dc-dc Converter (BHDC) 500. The BHDC 500 is a bidirectional high voltage DC converter, which drops the high voltage of the fuel cell 100 to low voltage and transfers reduced voltage to the battery 600, thus charging the battery 600. When the voltage of the fuel cell 100 reaches below the effective voltage, the controller 400 determines that the air remaining in the fuel cell 100 has been exhausted, and supplies hydrogen to the fuel cell 100.

The controller 400 stops supplying hydrogen if the pressure of the hydrogen supply line 200 reaches a target pressure value when hydrogen is supplied after the air supply is cut off, and measures the pressure reduction amount of the hydrogen supply line 200 for a reference time period from a time when the hydrogen supply is stopped, as a pressure variation. The controller 400 checks whether the pressure of the hydrogen supply line 200 reaches the target pressure value through the hydrogen supply pressure sensor 210 when hydrogen is supplied after air supply is cut off. At the instant time, the target pressure value means a pressure value which is greater than atmospheric pressure and is supplied to the fuel cell 100 above a minimum pressure value required during the operation of the fuel cell 100. When the hydrogen supply pressure sensor 210 measures that the pressure of the hydrogen supply line 200 reaches the target pressure value, the controller 400 stops supplying hydrogen. Furthermore, the controller 400 measures the pressure reduction amount of the hydrogen supply line 200 for a reference time from time when the supply of hydrogen is stopped, based on the set reference time. In a state where the supply of air is cut off and the supply of hydrogen is cut off, the fuel cell 100 is kept sealed. By keeping the fuel cell 100 sealed, the crossover amount of hydrogen generated in the anode of the fuel cell 100 may be checked. Due to the occurrence of the crossover in the anode of the fuel cell 100, the pressure of the hydrogen supply line 200 is reduced. Therefore, the controller 400 measures the pressure reduction amount of the hydrogen supply line 200 for the reference time, and measures it as the pressure variation of the hydrogen supply line 200. Furthermore, the controller 400 stores the measured pressure variation of the hydrogen supply line 200 in a memory.

Subsequently, the operation of the fuel cell 100 is terminated, and the controller 400 checks whether there is an error in a previously derived correction value of the hydrogen supply pressure sensor. As shown in FIG. 1, the hydrogen supply system of the fuel cell 100 further includes a discharge line 300 which is connected to an outlet side of the anode of the fuel cell 100 and communicates with the outside thereof, and a discharge valve 310 which is provided on the discharge line 300 to control communication between the outlet side of the anode of the fuel cell 100 and the outside. Furthermore, the controller 400 supplies hydrogen to the target pressure value after the operation of the fuel cell 100 is terminated, and opens the discharge valve 310 for the reference time if the hydrogen supply is completed. The controller 400 supplies hydrogen when the operation of the fuel cell 100 is terminated, and sets the pressure of supplied hydrogen as the target pressure value. Thus, when hydrogen is supplied to the target pressure value during the operation of the fuel cell 100, the measured pressure variation of the hydrogen supply line 200 may be used. Furthermore, when the hydrogen supply is completed, the controller 400 opens the discharge valve 310 to make the fuel cell 100 communicate with the outside. At the instant time, the controller 400 opens the discharge valve 310 for the reference time, thus generating the same condition as the pressure variation generated for the reference time in the fuel cell 100 during the operation of the fuel cell 100.

The controller 400 derives the pressure value of the hydrogen supply line 200 detected by the hydrogen supply pressure sensor 210 after the discharge valve is opened for the reference time, and determines a difference between the derived pressure value of the hydrogen supply line 200 and the target pressure value, as a pressure error. Because the controller 400 sets the pressure variation of the hydrogen supply line 200 as a comparison reference, data which is to be compared with the pressure variation also needs to be determined under the same condition. Here, the same condition may become the reference time. Therefore, the controller 400 opens the discharge valve 310 for the reference time to derive the pressure value of the hydrogen supply line 200 detected by the hydrogen supply pressure sensor 210. Because the discharge valve 310 is opened so that the fuel cell 100 communicates with the outside, the hydrogen pressure of the fuel cell anode drops and hydrogen is supplied to maintain the target pressure value. At the instant time, the controller 400 derives the pressure value of the hydrogen supply line 200 detected by the hydrogen supply pressure sensor 210. Furthermore, the controller 400 determines a difference between the target pressure value of hydrogen supplied after the operation of the fuel cell 100 is terminated and the derived pressure value of the hydrogen supply line 200. Hereinafter, the difference between the derived pressure value of the hydrogen supply line 200 and the target pressure value is expressed as the pressure error.

The determined pressure error becomes a reference for determining whether the discharge valve 310 is normally opened, as the pressure variation caused by the opening of the discharge valve 310. Thus, the controller 400 reflects the correction factor in the pressure variation stored in the memory, and compares the pressure variation in which the correction factor is reflected and the magnitude of the pressure error, thus determining whether to use the correction value of the hydrogen supply pressure sensor. The controller 400 compares the pressure variation stored in the memory after the discharge valve 310 is opened and the determined magnitude of the pressure error.

Meanwhile, the controller 400 reflects the correction factor in the pressure variation when comparing the pressure variation with the magnitude of the pressure error, and the controller 400 needs to determine the correction factor which is to be reflected in the pressure variation. The controller 400 measures the maximum opening amount and the maximum opening arrival time of the discharge valve after the discharge valve 310 is opened, and determines the correction factor based on the maximum opening amount and the maximum opening arrival time of the discharge valve 310. The controller 400 measures the maximum opening amount and the maximum opening arrival time of the discharge valve 310 after the discharge valve 310 is opened. At the instant time, the controller 400 may have a sensor on the discharge valve 310 to measure the maximum opening amount and the maximum opening arrival time of the discharge valve 310 based on data obtained by the sensor. The discharge valve 310 may further include a voltage sensor that measure a voltage when the discharge valve 310 is maximally opened, and the controller 400 may check the maximum opening amount of the discharge valve 310 based on the data measured through a voltage sensor. Furthermore, the controller 400 may measure time when the discharge valve 310 opens to the maximum, through the voltage sensor of the discharge valve 310.

Subsequently, the controller 400 determines whether to use the maximum opening amount and the maximum opening arrival time of the discharge valve 310 measured based on the previously stored reference value of the discharge valve 310, and determines the correction factor depending on the maximum opening arrival time of the discharge valve 310 when the measured maximum opening amount and maximum opening arrival time of the discharge valve 310 may be used. The reference value of the discharge valve 310 may be previously stored in the controller 400. Furthermore, the reference value of the discharge valve 310 may become the reference maximum opening amount and the maximum opening reference arrival time of the discharge valve 310.

FIG. 2 is a graph determining the condition of the discharge valve when the hydrogen supply system for the fuel cell according to an exemplary embodiment of the present disclosure is controlled. The graph of FIG. 2 is a graph which is set based on obtained data if there is no problem with the discharge valve 310. A voltage value obtained through the voltage sensor when the discharge valve 310 is opened to the maximum is equal to 6V, and it takes one second to reach the maximum opening time. As shown in FIG. 2, the state area of the discharge valve 310 may be divided based on the reference maximum opening amount and the maximum opening reference arrival time of the discharge valve 310. Areas A and B are areas in which the discharge valve 310 is determined to be in a normal state, while areas C and D are areas in which it is determined that failure occurs in the discharge valve 310. The controller 400 may determine whether the discharge valve 310 is normal or not, by matching the measured maximum opening amount and maximum opening arrival time of the discharge valve 310 with the graph of FIG. 2.

When the maximum opening amount and maximum opening arrival time of the discharge valve 310 measured by the controller 400 correspond to the areas A and B, the controller 400 determines that the measured maximum opening amount and maximum opening arrival time of the discharge valve 310 are available. Thus, the controller 400 determines the correction factor according to the maximum opening arrival time of the discharge valve 310. Furthermore, FIG. 3 is a graph determining the correction factor depending on the condition of the discharge valve when the hydrogen supply system for the fuel cell according to an exemplary embodiment of the present disclosure is controlled. When the measured maximum opening amount and maximum opening arrival time of the discharge valve 310 correspond to the areas A and B of FIG. 2, the controller 400 determines the correction factor corresponding to the maximum opening arrival time of the discharge valve 310 with reference to FIG. 3. However, when the maximum opening amount and maximum opening arrival time of the discharge valve 310 measured by the controller 400 correspond to the areas C and D, the controller 400 determines that it is impossible to use the measured maximum opening amount and maximum opening arrival time of the discharge valve 310. This is regarded as a problem in the opening of the discharge valve 310, and the controller 400 determines that failure occurs in the discharge valve 310. Therefore, when failure occurs in the discharge valve 310, the controller 400 performs logic for inspecting the failure of the discharge valve 310.

The controller 400 reflects the correction factor in the pressure variation of the hydrogen supply line 200 after the correction factor is determined, and compares it with the determined pressure error. If the determined pressure error is greater than the pressure variation value in which the correction factor is reflected, the controller 400 utilizes the correction value of the hydrogen supply pressure sensor 210. The controller 400 compares a value obtained by reflecting the correction factor in the pressure variation stored in the memory and the magnitude of the determined pressure error. When the determined pressure error is large, it is determined that there is no problem in the opening of the discharge valve 310 and communication with the outside is performed well. Thus, the controller 400 determines that there is no error in a process of deriving the correction value of the hydrogen supply pressure sensor 210, and stores it in the memory to use the derived correction value when the hydrogen supply pressure sensor 210 is corrected.

However, if the determined pressure error is smaller than a pressure variation value in which the correction factor is reflected, the controller 400 does not use the correction value of the hydrogen supply pressure sensor 210, and eliminates the correction value of the hydrogen supply pressure sensor 210 to derive the correction value of the hydrogen supply pressure sensor 210 again. When the determined pressure error is smaller than the pressure variation value in which the correction factor is reflected, the controller 400 determines that there is a problem in the opening of the discharge valve 310. When the determined pressure error is smaller than the pressure variation value in which the correction coefficient is reflected, the controller 400 determines that there is a problem in the opening of the discharge valve 310. The controller 400 checks the failure of the discharge valve 310, which is not determined in a process of determining the correction factor, once more in the above process. Even if there is no problem in the opening of the discharge valve 310, a problem may occur in communication with the outside due to the clogging of the pipe or freezing of the discharge valve 310. When failure occurs in the discharge valve 310, the controller 400 determines that there is an error in the correction value of the hydrogen supply pressure sensor 210 determined when the hydrogen supply pressure sensor 210 is corrected. Subsequently, the controller 400 does not use and eliminates the derived correction value of the hydrogen supply pressure sensor 210, inspects the failure of the discharge valve 310, and then derives the new correction value of the hydrogen supply pressure sensor 210. The controller 400 compares the pressure error with the pressure variation value in which the correction factor is reflected, it is possible to check once again the failure of the discharge valve 310 due to the clogging of the pipe or freezing of the discharge valve 310, enhancing the reliability of the determined correction value of the hydrogen supply pressure sensor.

FIG. 4 and FIG. 5 are flowcharts illustrating a method of controlling a hydrogen supply system for a fuel cell, according to an exemplary embodiment of the present disclosure. FIG. 4 is a flowchart illustrating the method of controlling the hydrogen supply system for the fuel cell during the operation of the fuel cell, according to an exemplary embodiment of the present disclosure, and FIG. 5 is a flowchart illustrating the method of controlling the hydrogen supply system for the fuel cell after the operation of the fuel cell is terminated, according to an exemplary embodiment of the present disclosure. The method of controlling the hydrogen supply system for the fuel cell 100 according to an exemplary embodiment of the present disclosure includes a step S100 of deriving a correction value of a hydrogen supply pressure sensor 210 by a controller 400, a step S200 of supplying hydrogen after air supply is cut off during the operation of the fuel cell 100 by the controller 400, and steps S700, S710, and S720 of measuring a pressure variation of the hydrogen supply line 200 after hydrogen is supplied and determining whether to use the correction value of the hydrogen supply pressure sensor based on the measured pressure variation by the controller 400.

To determine whether to use the correction value of the hydrogen supply pressure sensor by controlling the hydrogen supply system of the fuel cell 100, the correction value of the hydrogen supply pressure sensor 210 should be first derived (S100). Subsequently, the controller 400 cuts off air supplied to the fuel cell 100 during the operation of the fuel cell 100 (S210). The air supply of the fuel cell 100 is cut off, and the controller 400 induces the charging of a battery 600 to exhaust air remaining in the fuel cell 100 (S220). The controller 400 performs the power generating operation of the fuel cell 100 to exhaust air remaining in the fuel cell 100, and is configured to control so that voltage generated due to the power generation of the fuel cell 100 is used to charge the battery 600. The controller 400 checks whether the voltage of the fuel cell 100 drops below effective voltage (S230), and supplies hydrogen to the fuel cell 100 when the voltage of the fuel cell 100 reaches below the effective voltage (S240).

In the step S200 of supplying hydrogen after air supply is cut off, the controller 400 supplies hydrogen so that the pressure of the hydrogen supply line 200 reaches a target pressure value (S240, S250). The controller 400 checks whether the pressure of the hydrogen supply line 200 reaches the target pressure value through the hydrogen supply pressure sensor 210 (S250). When the pressure of the hydrogen supply line 200 reaches the target pressure value, the controller 400 stops supplying the hydrogen (S260).

In the steps S700, S710, and S720 of determining whether to use the correction value of the hydrogen supply pressure sensor, the controller 400 stops supplying hydrogen when the pressure of the hydrogen supply line 200 reaches the target pressure value, and measures the pressure variation amount of the hydrogen supply line 200 for a reference time period from a time when the hydrogen supply is stopped. Furthermore, the measured pressure variation is stored in a memory. In a state where hydrogen and air are cut off, a crossover in which hydrogen moves to a cathode may occur in the fuel cell anode. Due to the occurrence of the crossover, the pressure of the hydrogen supply line 200 is reduced. Therefore, the controller 400 measures the pressure reduction amount of the hydrogen supply line 200 for a predetermined reference time, as a pressure variation, and stores it in the memory (S300).

Subsequently, the controller 400 checks time when the operation of the fuel cell 100 is terminated (S400). When the operation of the fuel cell 100 is terminated, the controller 400 supplies hydrogen to the fuel cell 100 at the target pressure value (S500). The controller 400 checks whether the pressure of the hydrogen supply line 200 reaches the target pressure value through the hydrogen supply pressure sensor 210, thus checking whether the supply of hydrogen is completed to the target pressure value (S510). In steps S700, S710, and S720 of determining whether to use the correction value of the hydrogen supply pressure sensor, the controller 400 reflects the correction factor in the pressure variation stored in the memory, opens the discharge valve fora reference time, and then derives the pressure value of the hydrogen supply line 200 detected by the hydrogen supply pressure sensor 210. Furthermore, the pressure variation in which the correction factor is reflected, and a difference between the derived pressure value of the hydrogen supply line 200 and the target pressure value are compared, thus determining whether to use the correction value of the hydrogen supply pressure sensor.

The controller 400 opens the discharge valve 310 for the set reference time when the supply of hydrogen is completed (S600). When the discharge valve 310 is opened, the fuel cell 100 communicates with the outside thereof, so that the pressure of the hydrogen supply line 200 drops, and hydrogen is supplied to compensate for a drop in pressure. The hydrogen supply pressure sensor 210 derives a detected pressure value when the discharge valve 310 is opened for the reference time (S610). Furthermore, the controller 400 determines a difference between the pressure value derived from the hydrogen supply pressure sensor 210 and the target pressure value as a pressure error (S620).

Furthermore, when the discharge valve 310 is opened for the reference time, the controller 400 determines the correction factor (S630). The correction factor is a value determined based on the maximum opening amount and maximum opening arrival time of the discharge valve 310. The controller 400 determines whether to use the maximum opening amount and the maximum opening arrival time based on the reference value of the discharge valve 310 when the correction factor is determined. When the maximum opening amount and maximum opening arrival time of the discharge valve 310 may be used, the controller 400 determines the correction factor depending on the maximum opening arrival time of the discharge valve 310. Thereafter, the controller 400 reflects the determined correction factor in the pressure variation (S640).

Subsequently, the controller 400 compares the determined pressure error and the pressure variation value in which the correction factor is reflected (S700). When the determined pressure error is greater than the pressure variation in which the correction factor is reflected, the controller 400 utilizes the derived correction value of the hydrogen supply pressure sensor 210 (S710). When the determined pressure error is greater than the pressure variation in which the correction factor is reflected, this means that the fuel cell 100 communicates well with the outside thereof, and there is no error in a process of deriving the correction value of the hydrogen supply pressure sensor 210. Therefore, the controller 400 utilizes the derived correction value of the hydrogen supply pressure sensor 210 when the hydrogen supply pressure sensor 210 is corrected.

However, when the determined pressure error is smaller than the pressure variation in which the correction factor is reflected, the controller 400 eliminates the derived correction value of the hydrogen supply pressure sensor 210, and derives the correction value again (S720). When the determined pressure error is smaller than the pressure variation in which the correction factor is reflected, this means that the fuel cell 100 does not communicate with the outside and thus there is an error in a process of deriving the correction value of the hydrogen supply pressure sensor 210. If the fuel cell 100 does not communicate with the outside thereof, this means that failure such as the pipe clogging or the freezing occurs in the discharge valve 310. The correction value of the hydrogen supply pressure sensor 210 derived when failure occurs in the discharge valve 310 is a value in which an error condition is reflected when the hydrogen supply pressure sensor 210 is corrected. Therefore, the controller 400 eliminates the derived correction value of the hydrogen supply pressure sensor 210, solves the failure of the discharge valve 310, and then derives the correction value of the hydrogen supply pressure sensor 210 again.

By determining whether to use the correction value of the hydrogen supply pressure sensor 210 through comparison between the determined pressure error and the pressure variation in which the correction factor is reflected, it is possible to check whether the fuel cell 100 communicates with the outside and inspect the failure of the discharge valve 310. Furthermore, the reliability of the derived correction value of the hydrogen supply pressure sensor 210 may be increased by inspecting the failure of the discharge valve 310.

As described above, the present disclosure provides a hydrogen supply system for a fuel cell and a control method thereof, in which the correction value of a hydrogen supply pressure sensor is derived, and then it is determined whether to use the correction value of a hydrogen supply pressure sensor based on the pressure variation of a hydrogen supply line in which the correction factor determined depending on the state of a discharge valve is reflected, thus preventing the excessive supply or lack of hydrogen due to the incorrectly derived correction value of the hydrogen supply pressure sensor.

Furthermore, a correction factor determined according to the condition of a discharge valve is reflected in the pressure variation of a hydrogen supply line when it is determined whether to use the correction value of a hydrogen supply pressure sensor, thus enhancing the reliability of the correction value of the hydrogen supply pressure sensor.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hydrogen supply system for a fuel cell, the system comprising:

the fuel cell;

a hydrogen supply line connected to an inlet side of an anode of the fuel cell to supply hydrogen to the fuel cell;

a hydrogen supply pressure sensor configured for measuring pressure of the hydrogen supply line;

a controller electrically connected to the hydrogen supply pressure sensor and configured for deriving a correction value of the hydrogen supply pressure sensor, supplying the hydrogen after air supply is cut off during an operation of the fuel cell, measuring a pressure variation of the hydrogen supply line, and selectively applying the correction value of the hydrogen supply pressure sensor based on a magnitude of the measured pressure variation;

a discharge line connected to an outlet side of the anode of the fuel cell to communicate with an outside thereof; and a discharge valve provided on the discharge line to control communication between the outlet side of the anode of the fuel cell and the outside, wherein the controller is configured to supply the hydrogen to a target pressure value after the operation of the fuel cell is terminated, and to open the discharge valve for a reference time period when the hydrogen supply is completed, wherein the controller is configured to derive a pressure value of the hydrogen supply line detected by the hydrogen supply pressure sensor after the discharge valve is opened for the reference time period, and to determine a difference between the derived pressure value of the hydrogen supply line and the target pressure value, as a pressure error, wherein the controller is configured to reflect a correction factor in the pressure variation stored in a memory, and to compare the pressure variation in which the correction factor is reflected with a magnitude of the pressure error, thus determining whether to use the correction value of the hydrogen supply pressure sensor, and wherein the controller is configured to measure a maximum opening amount and a maximum opening arrival time of the discharge valve after the discharge valve is opened, and the correction factor is determined based on the maximum opening amount and the maximum opening arrival time of the discharge valve.

2. The hydrogen supply system of claim 1, wherein the controller is configured to induce charging of a battery until voltage of the fuel cell reaches below effective voltage when the air supply is cut off during an operation of the fuel cell, and to supply the hydrogen when the voltage of the fuel cell reaches below the effective voltage.

3. The hydrogen supply system of claim 1, wherein the controller is configured to stop supplying the hydrogen when the pressure of the hydrogen supply line reaches the target pressure value when the hydrogen is supplied after the air supply is cut off, and to measure a pressure reduction amount of the hydrogen supply line for a reference time period from a time when the hydrogen supply is stopped, as the pressure variation.

4. The hydrogen supply system of claim 3, wherein the target pressure value is a pressure value which is greater than atmospheric pressure and is supplied to the fuel cell above a minimum pressure value required during the operation of the fuel cell.

5. The hydrogen supply system of claim 3, wherein the controller is configured to store the measured pressure variation of the hydrogen supply line in the memory.

6. The hydrogen supply system of claim 1, wherein the controller is configured to determine whether to use the maximum opening amount and the maximum opening arrival time of the discharge valve measured based on a previously stored reference value of the discharge valve, and to determine the correction factor depending on the maximum opening arrival time of the discharge valve when the measured maximum opening amount and maximum opening arrival time of the discharge valve are available.

7. A hydrogen supply system for a fuel cell, the system comprising:

the fuel cell;

a hydrogen supply line connected to an inlet side of an anode of the fuel cell to supply hydrogen to the fuel cell;

a hydrogen supply pressure sensor configured for measuring pressure of the hydrogen supply line;

a controller electrically connected to the hydrogen supply pressure sensor and configured for deriving a correction value of the hydrogen supply pressure sensor, supplying the hydrogen after air supply is cut off during an operation of the fuel cell, measuring a pressure variation of the hydrogen supply line, and selectively applying the correction value of the hydrogen supply pressure sensor based on a magnitude of the measured pressure variation, a discharge line connected to an outlet side of the anode of the fuel cell to communicate with an outside thereof; and a discharge valve provided on the discharge line to control communication between the outlet side of the anode of the fuel cell and the outside, wherein the controller is configured to supply the hydrogen to a target pressure value after the operation of the fuel cell is terminated, and to open the discharge valve for a reference time period when the hydrogen supply is completed, wherein the controller is configured to derive a pressure value of the hydrogen supply line detected by the hydrogen supply pressure sensor after the discharge valve is opened for the reference time period, and to determine a difference between the derived pressure value of the hydrogen supply line and the target pressure value, as a pressure error, wherein the controller is configured to reflect a correction factor in the pressure variation stored in a memory, and to compare the pressure variation in which the correction factor is reflected with a magnitude of the pressure error, thus determining whether to use the correction value of the hydrogen supply pressure sensor, and wherein the controller is configured to utilize the correction value of the hydrogen supply pressure sensor, when the determined pressure error is greater than a pressure variation value in which the correction factor is reflected.

8. A hydrogen supply system for a fuel cell, the system comprising:

the fuel cell;

a hydrogen supply line connected to an inlet side of an anode of the fuel cell to supply hydrogen to the fuel cell;

a hydrogen supply pressure sensor configured for measuring pressure of the hydrogen supply line;

a controller electrically connected to the hydrogen supply pressure sensor and configured for deriving a correction value of the hydrogen supply pressure sensor, supplying the hydrogen after air supply is cut off during an operation of the fuel cell, measuring a pressure variation of the hydrogen supply line, and selectively applying the correction value of the hydrogen supply pressure sensor based on a magnitude of the measured pressure variation;

a discharge line connected to an outlet side of the anode of the fuel cell to communicate with an outside thereof; and a discharge valve provided on the discharge line to control communication between the outlet side of the anode of the fuel cell and the outside, wherein the controller is configured to supply the hydrogen to a target pressure value after the operation of the fuel cell is terminated, and to open the discharge valve for a reference time period when the hydrogen supply is completed, wherein the controller is configured to derive a pressure value of the hydrogen supply line detected by the hydrogen supply pressure sensor after the discharge valve is opened for the reference time period, and to determine a difference between the derived pressure value of the hydrogen supply line and the target pressure value, as a pressure error, wherein the controller is configured to reflect a correction factor in the pressure variation stored in a memory, and to compare the pressure variation in which the correction factor is reflected with a magnitude of the pressure error, thus determining whether to use the correction value of the hydrogen supply pressure sensor, and wherein the controller is configured to not use the correction value of the hydrogen supply pressure sensor, and to eliminate the correction value of the hydrogen supply pressure sensor to derive the correction value of the hydrogen supply pressure sensor again, when the determined pressure error is smaller than a pressure variation value in which the correction factor is reflected.

* * * * *